(12) United States Patent
Kalkanoglu et al.

(10) Patent No.: US 8,397,446 B2
(45) Date of Patent: Mar. 19, 2013

(54) COMPOSITE ROOFING OR OTHER SURFACING BOARD, METHOD OF MAKING AND USING AND ROOF MADE THEREBY

(75) Inventors: Husnu M. Kalkanoglu, Swarthmore, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 287 days.

(21) Appl. No.: 12/368,364

(22) Filed: Feb. 10, 2009

(65) Prior Publication Data

US 2010/0199584 A1 Aug. 12, 2010

(51) Int. Cl.
*E04D 13/18* (2006.01)

(52) U.S. Cl. ... 52/173.3; 52/745.21; 52/409; 52/747.11; 136/244; 428/40.1

(58) Field of Classification Search ............ 52/409–411, 52/449, 454, 745.21, 747.11, 749.12, 173.3; 428/40.3, 40.1, 41.7, 42.2; 136/244
See application file for complete search history.

(56) References Cited

U.S. PATENT DOCUMENTS

| | | | |
|---|---|---|---|
| 2,037,297 A * | 4/1936 | Yeager | 428/174 |
| 2,472,100 A * | 6/1949 | Fair, Jr. | 428/467 |
| 3,451,537 A | 6/1969 | Freeman | |
| 3,547,674 A * | 12/1970 | Gagle et al. | 442/123 |
| 3,813,280 A * | 5/1974 | Olszyk et al. | 428/141 |
| 3,849,229 A * | 11/1974 | Spillane et al. | 156/304.3 |
| 3,929,545 A * | 12/1975 | Van Dyck et al. | 156/220 |
| 4,028,450 A * | 6/1977 | Gould | 264/45.5 |
| 4,091,135 A * | 5/1978 | Tajima et al. | 428/40.3 |
| 4,357,377 A * | 11/1982 | Yamamoto | 428/40.3 |
| 4,374,687 A * | 2/1983 | Yamamoto | 156/71 |
| 4,674,244 A * | 6/1987 | Francovitch | 52/173.3 |
| 4,755,409 A * | 7/1988 | Harkness | 428/40.3 |
| 4,860,509 A * | 8/1989 | Laaly et al. | 52/173.3 |
| 4,870,796 A * | 10/1989 | Hart et al. | 52/409 |
| 4,886,554 A * | 12/1989 | Woodring et al. | 136/244 |
| 5,143,761 A | 9/1992 | Chiotis et al. | |
| 5,215,598 A * | 6/1993 | Kouzuma et al. | 136/251 |
| 5,310,278 A | 5/1994 | Kaczmarczik et al. | |
| 5,316,592 A * | 5/1994 | Dinwoodie | 136/244 |
| 5,665,447 A * | 9/1997 | Greaves et al. | 428/68 |
| 5,729,946 A | 3/1998 | Beck | |
| 5,737,897 A * | 4/1998 | Naipawer, III | 52/796.1 |
| 5,857,303 A | 1/1999 | Beck et al. | |
| 5,887,743 A | 3/1999 | Stahlecker et al. | |
| 5,953,877 A | 9/1999 | Kalkanoglu et al. | |
| 6,000,185 A | 12/1999 | Beck et al. | |

(Continued)

FOREIGN PATENT DOCUMENTS

WO W02006121433 A1 11/2006

*Primary Examiner* — Phi D. A
(74) *Attorney, Agent, or Firm* — Paul & Paul

(57) ABSTRACT

A composite roofing board is provided, including a layer of bituminous core material having pieces or particles of shingles, rolled roofing, etc. that have been broken-up or comminuted therein, with the core material having layers of mat material on opposite surfaces thereof, also in layers, and with an adhesive applied to an outer surface of one of the layers of mat material, with a peelable and removable release liner layer covering the adhesive. The various layers are provided as a sandwich, to make the composite board. A plurality of composite boards may be applied to a roof deck or other roof structure, and they can be butt-joined and taped together with a joint tape. The method of making the composite board can be continuous.

20 Claims, 5 Drawing Sheets

U.S. PATENT DOCUMENTS

| | | | |
|---|---|---|---|
| 6,006,481 A * | 12/1999 | Jacobs | 52/309.9 |
| 6,237,288 B1 | 5/2001 | Jenkins et al. | |
| 6,355,132 B1 | 3/2002 | Becker et al. | |
| 6,465,091 B1 * | 10/2002 | Ou-Yang | 428/352 |
| 6,465,103 B2 | 10/2002 | Tsai et al. | |
| 6,467,235 B2 | 10/2002 | Kalkanoglu et al. | |
| 6,523,316 B2 | 2/2003 | Stahl et al. | |
| 6,524,671 B1 | 2/2003 | Spohn | |
| 6,553,729 B1 * | 4/2003 | Nath et al. | 52/173.3 |
| 6,630,047 B2 | 10/2003 | Jing et al. | |
| 6,632,518 B1 | 10/2003 | Schmidt et al. | |
| 6,679,308 B2 | 1/2004 | Becker et al. | |
| 6,692,669 B2 | 2/2004 | Mischo | |
| 6,715,252 B2 | 4/2004 | Stahl et al. | |
| 6,729,081 B2 * | 5/2004 | Nath et al. | 52/173.3 |
| 6,730,841 B2 * | 5/2004 | Heckeroth | 136/251 |
| 6,945,000 B1 * | 9/2005 | Hohmann et al. | 52/513 |
| 7,048,990 B2 * | 5/2006 | Koschitzky | 428/144 |
| 7,070,675 B2 | 7/2006 | Schmidt et al. | |
| 7,118,794 B2 | 10/2006 | Kalkanoglu et al. | |
| 7,241,500 B2 | 7/2007 | Shiao et al. | |
| 7,328,534 B2 * | 2/2008 | Dinwoodie | 52/173.3 |
| 7,469,508 B2 * | 12/2008 | Ceria | 52/173.3 |
| 7,557,291 B2 * | 7/2009 | Flaherty et al. | 136/244 |
| 7,635,810 B2 * | 12/2009 | Luch | 136/256 |
| 7,642,449 B2 * | 1/2010 | Korman et al. | 136/244 |
| 7,732,243 B2 * | 6/2010 | Luch | 438/57 |
| 7,898,054 B2 * | 3/2011 | Luch | 257/448 |
| 2002/0110679 A1 * | 8/2002 | Miller et al. | 428/297.1 |
| 2003/0082365 A1 | 5/2003 | Geary et al. | |
| 2004/0144043 A1 | 7/2004 | Stevenson et al. | |
| 2005/0072456 A1 | 4/2005 | Stevenson et al. | |
| 2005/0178428 A1 * | 8/2005 | Laaly et al. | 136/251 |
| 2006/0029775 A1 | 2/2006 | MacKinnon et al. | |
| 2008/0241430 A1 | 10/2008 | Imai | |
| 2008/0248241 A1 | 10/2008 | Kalkanoglu | |
| 2008/0271774 A1 | 11/2008 | Kalkanoglu | |
| 2009/0000221 A1 | 1/2009 | Jacobs | |
| 2009/0133340 A1 | 5/2009 | Shiao | |
| 2009/0133738 A1 | 5/2009 | Shiao | |
| 2009/0159118 A1 | 6/2009 | Kalkanoglu et al. | |

* cited by examiner

COMPOSITE ROOFING OR OTHER SURFACING BOARD, METHOD OF MAKING AND USING AND ROOF MADE THEREBY

BACKGROUND OF THE INVENTION

It is known in the roofing art to apply composite roofing boards to a roof deck, and to apply a roof covering material, such as shingles or roll roofing thereover.

THE PRESENT INVENTION

The present invention is directed to providing a composite board for use as a roofing or other surfacing material, having a novel construction, and to provide a roof or other surface made up of a plurality of composite boards applied over a roof or other structure, and then to cover the composite boards with shingles, tiles or a waterproofing membrane or other surfacing material. A method of making a composite board is also provided, as is a method of roofing a roof structure using such composite boards.

SUMMARY OF THE INVENTION

A composite board is provided for use as a roofing material or other surfacing material, that comprises a sandwich of a core material layer having layers of mat material on opposite surfaces thereof, one of which has a layer of adhesive secured thereto, which, in turn, has a removable layer of release liner covering the adhesive. The core material includes a solidified bituminous material having filler components of recycled roofing products that may be made from particles or pieces of shingles or other roofing materials such as roll roofing particles.

The release paper is removed to allow application of the composite board onto a roof deck or other structure, such that the adhesive layer can secure the composite boards to the roof deck or other structure.

Accordingly, it is a primary object of this invention to provide a novel composite board for use as a roofing material or other surfacing material, that comprises a core material layer that includes solidified bituminous material having filler components of recycled roofing products therein, with layers of mat material on opposite surfaces of the core material layer, and with the layer of adhesive on one of the layers of mat material, that in turn, is covered by a removable layer of release liner.

It is another object of this invention to accomplish the above object, wherein a roof is made, comprised of composite boards as described in the object immediately above, wherein the composite boards may or may not be laid on a roof adjacent each other, and may or may not have adjacent edges butt-joined together and secured together with joint tape.

It is yet another object of this invention to accomplish the objects recited above, wherein the step of making a composite board is provided by first supplying a layer of mat material, and then providing a non-solid core material layer that includes a bituminous material and pieces or particles of shingles and/or roll roofing material, then applying a second layer of mat material onto the other surface of the core material, allowing the core material to solidify, then applying a layer of adhesive to one of the layers of mat material, followed by the application of a removable layer of release liner to the layer of adhesive.

It is yet another object of this invention to accomplish the above object, wherein the steps of making the composite board are continuous.

It is a further object of this invention to provide a method of roofing a roof structure.

Other objects and advantages of the present invention will become readily apparent upon a reading of the following brief descriptions of the drawing figures, the detailed descriptions of the preferred embodiments, and the appended claims.

BRIEF DESCRIPTION OF THE DRAWING FIGURES

FIG. 1 is a fragmentary schematic view of the process of providing a lower mat layer, delivered along a predetermined path, dispensing a preferably hot, flowable bituminous material having particles of roofing shingles, roll roofing, or the like therein, onto the layer of mat material, allowing the core material containing the bituminous material and shingle particles therein to cool, applying an upper layer of mat material to be secured to the core material, applying an adhesive to one of the layers of mat material, and thereafter applying a release layer to the layer of adhesive.

DETAILED DESCRIPTIONS OF THE PREFERRED EMBODIMENTS

Figure 1:
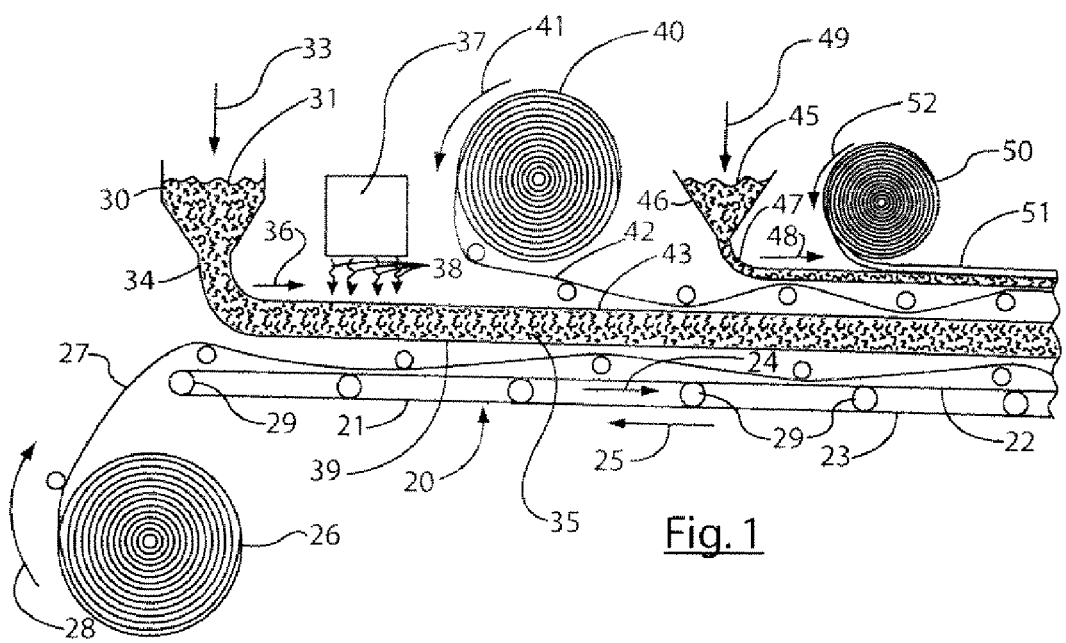

Referring to the drawings now in detail, reference is first made to FIG. 1, wherein an apparatus 20 is shown for manufacturing composite boards in accordance with this invention.

The apparatus 20 includes a continuous conveyor belt 21 having upper and lower runs 22 and 23, respectively, movable over rollers 29, in the respective directions of arrows 24, 25, when suitably driven by a motor (not shown) or the like.

At the left end of FIG. 1, a roll 26 of mat material 27 is provided, rotatable in the direction of arrow 28, to be delivered onto the upper run 22 of the conveyor belt 21, as shown.

As the lower layer 27 of mat passes beneath a hopper 30, a bituminous material, such as somewhat molten asphalt 31, carried in the hopper 30 is dispensed therefrom in the direction of the arrow 33, out a discharge 34 thereof, to be delivered with its lower surface 39 onto the upper surface of the mat layer 27 in the form of a core layer 35, to be delivered in the direction of the arrow 36 in FIG. 1.

Because the bituminous material 31 is in non-solid form, and is preferably heated to be somewhat molten, to carry a plurality of particles or pieces of shingles or roll roofing material that have been recycled as particles thereinto, the somewhat molten bituminous material 31 with the particles therein will preferably be allowed to cool and solidify. In this regard, a cooling unit 37 may deliver cooling air, gas or the like in the direction of the arrows 38 to the core layer 35 as shown, as the core layer 35 moves therepast in the direction of arrow 36.

A roll 40 of mat material, rotating in the direction of arrow 41, delivers another layer of mat material 42 onto the upper surface 43 of the core material layer 35, to be adhered thereto, prior to the upper surface 43 becoming permanently solidified.

Thereafter, an adhesive 45, preferably in somewhat molten form, is delivered from a hopper 46, dispensed therefrom in the direction of arrow 49, to form a layer 47 that adheres to the upper surface of the mat layer 42, as the adhesive layer 47 moves in the direction of the arrow 48, rightward as shown in FIG. 1.

Thereafter, a roll 50 of release liner 51, rotating in the direction of arrow 52, is applied to the upper surface of the adhesive layer 47 shown in FIG. 1.

It will be understood that the bituminous material 31 will preferably be an asphalt, that is heated in the hopper 30, to be somewhat molten, for ease of application onto the layer 27 of mat material. The core material will include pieces or particles of shingles, roofing products such as roll roofing or the like that have been comminuted, to be dispersed throughout the bituminous material 31 in the hopper 30, to be delivered onto the layer 27 of mat material preferably in a continuous manner as is schematically shown in FIG. 1. The roofing shingles or particles in the bituminous material 31 will preferably be particles having asphaltic materials or other bituminous materials therein, some fiber materials, some granules, etc., as would normally be obtained by comminuting or grinding up shingles, roll roofing, etc.

The mechanism 37 for solidifying the bituminous material with particles therein, can be a refrigerating mechanism, a fan blowing ambient air thereon, or even the simple presence of ambient air applied to the layer 35 of core material over some predetermined distance, or any other means for solidifying the layer 35 of core material. The mat materials delivered as layers 27, 42, from rolls 26, 40 respectively, can include fiberglass mat, organic felt, scrim, or any other suitable mat material.

The adhesive 45 provided from hopper 46, could be an asphalt material, or any other type of adhesive as may be desired, such as butyl, SBS, SIS, rubber resin or other adhesives.

The release liner or layer 51 provided from roll 50, can be any type of release material known in the art that can readily be removed from the adhesive layer 47, at the site of installation of the composite boards applied to a roof deck or other roof structure. The release liner 51 can be comprised of silicone coated plastic film or paper, or any other readily removable release liner.

As an alternative process, the adhesive could be applied to the release liner and then the adhesive on the liner could be laminated to what would become the bottom side of the composite board.

Figure 2:
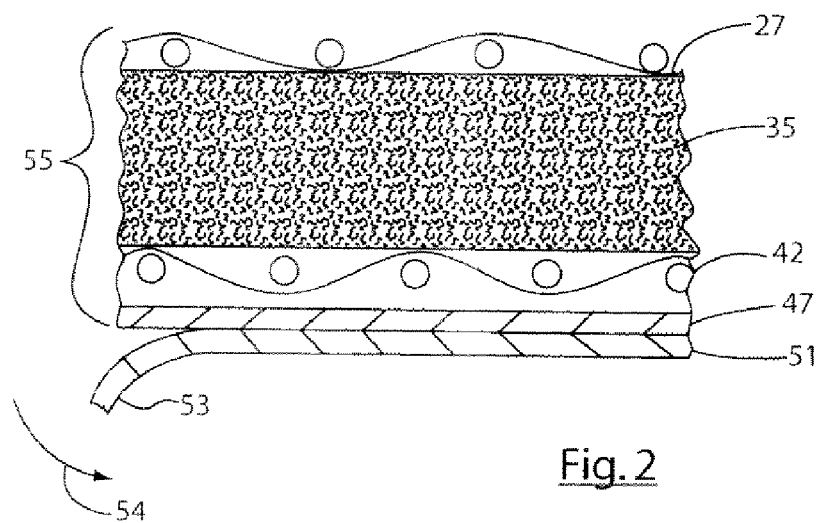
FIG. 2 is an enlarged fragmentary, longitudinal sectional view of a composite board for roofing formed in accordance with the schematic of FIG. 1, wherein the layer of release material is shown partially removed from the layer of adhesive.

With reference now to FIG. 2, it will be seen that the end product emanating from the right side of FIG. 1 is illustrated in inverted form, such that the core layer has a mat layer 27 on its upper surface and a mat layer 42 on its lower surface, with the adhesive layer 47 disposed against the lower surface of the mat layer 42, and with the layer 51 of release liner disposed thereagainst. The left end of the layer of release liner is shown, at 53, to be peelable away from the adhesive layer 47, by grasping the same and moving it in the direction of the arrow 54, when the composite board 55 for use as a roofing material is adapted to be used by applying it to a roof structure, roof deck, or the like. In some embodiments the release liner may have a pull tab or extension (not shown) beyond an edge of the composite board, to facilitate removal of the release liner.

It will also be understood that, as used herein, the roof structure to which the composite boards 55 can be applied, may comprise a roof deck of any particular construction, with or without a tarpaper or other waterproof liner disposed thereon.

Figure 3:
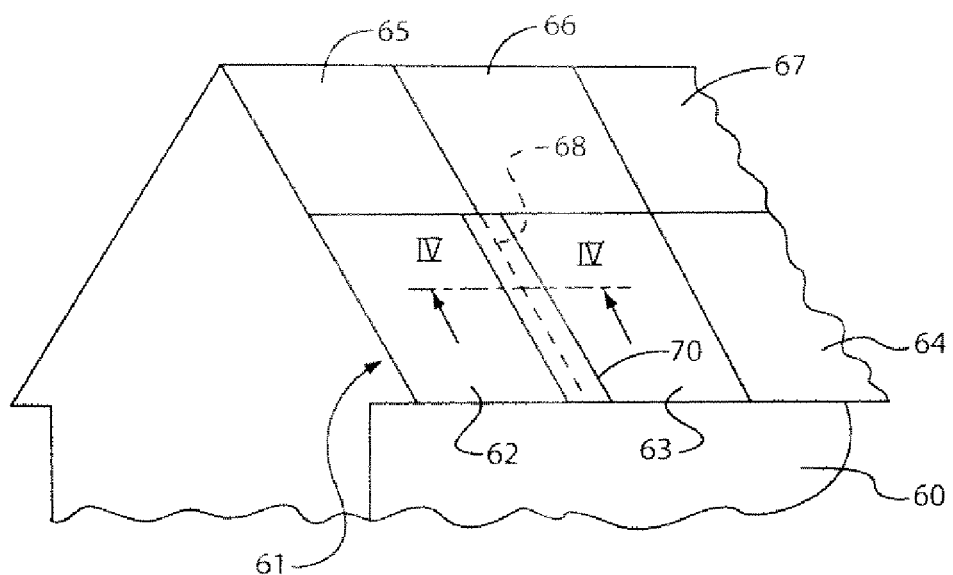
FIG. 3 is a fragmentary perspective illustration of a roof, having a plurality of composite boards that are made in accordance with FIGS. 1 and 2 disposed thereon, with edges butt-joined together, and in the case of two adjacent composite boards, having a joint tape overlying the butt-joined edges thereof.

With reference now to FIG. 3, it will be seen that a building structure 60 is illustrated, having a roof 61, with a plurality of composite boards 62-67 applied thereto, such composite boards being made in accordance with this invention as described above.

The composite boards 62 and 63 are shown being butt-joined together along the dotted line 68, shown beneath the layer 70 of joint tape that overlies the abutting edges of the composite boards 62, 63 that meet along joint line 68, and with the joint tape 70 being adhesively secured to the composite boards 62, 63, securing them together, and adding an additional waterproofing feature.

Figure 4:
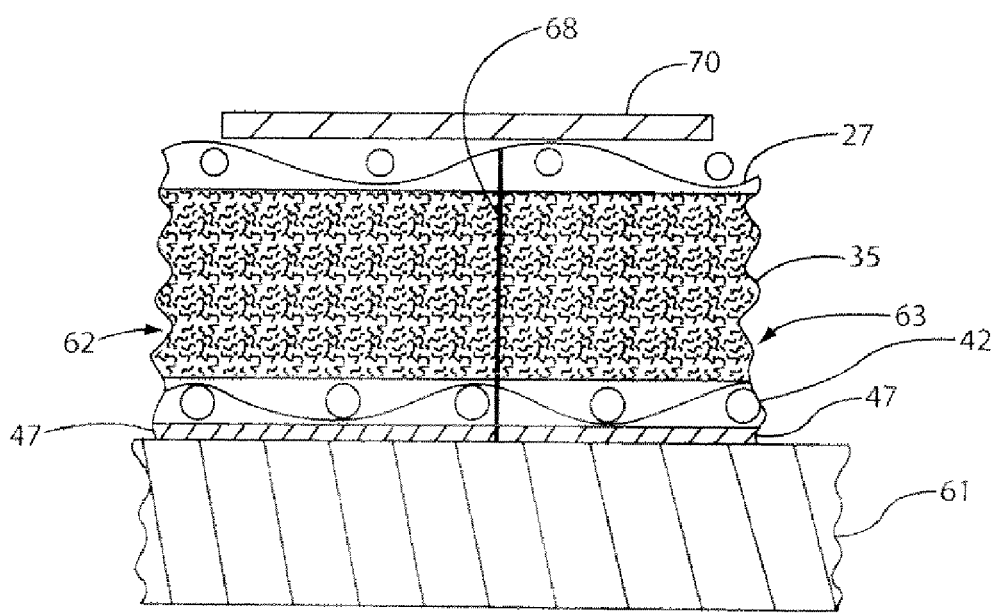
FIG. 4 is an enlarged fragmentary sectional view of the butt-joined edges of two of the composite boards shown on the roof illustrated in FIG. 3, taken generally along the line IV-IV of FIG. 3.

With reference now to FIG. 4, it will be seen that the roof deck 61 has the composite boards 62 and 63 shown adhesively secured thereto, by means of the adhesive layers 47 securing the boards 62, 63 thereto, and in the enlargement of FIG. 4, it is seen that the butt-joined edges of the boards, 62, 63, come together at the joint line 68, and are adjacent to each other, with their adjacent edges being held together by the layer of joint tape 70.

Figure 5:
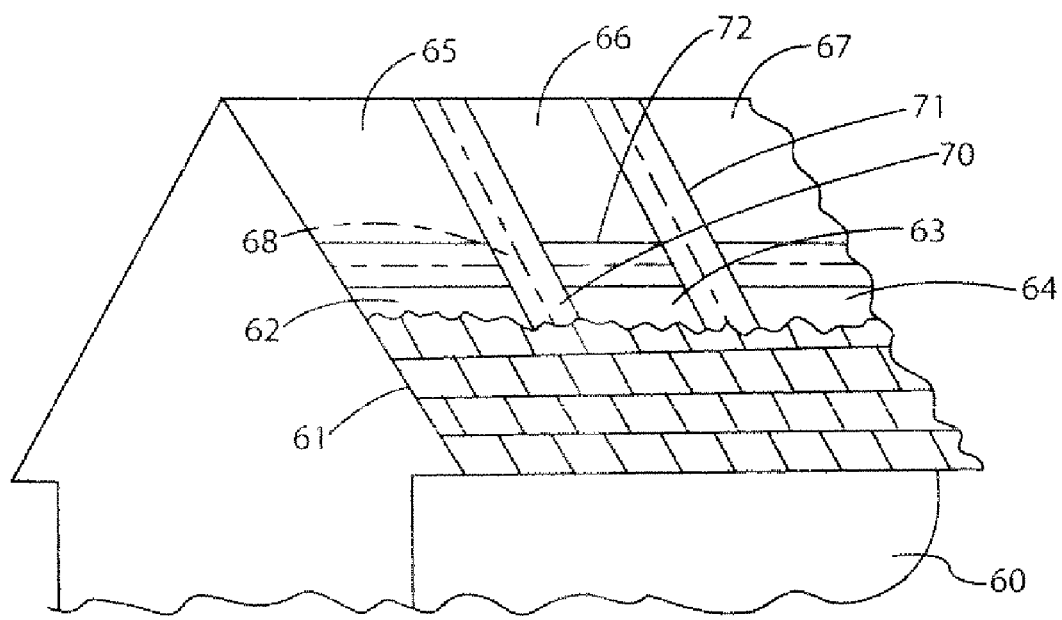
FIG. 5 is an illustration similar to that of FIG. 3, but wherein all of the butt-joined edges of composite boards have their edges secured together with joint tape applied thereto, and wherein a plurality of courses of shingles are shown, applied to the roof over composite boards.

In FIG. 5, the roof 61 of the structure 60 is shown, with joint tape strips 70, 71 and 72 being illustrated, applying the joint tape over a plurality of butt-joined edges of adjacent composite boards, 62-67, as described above.

Figure 6:
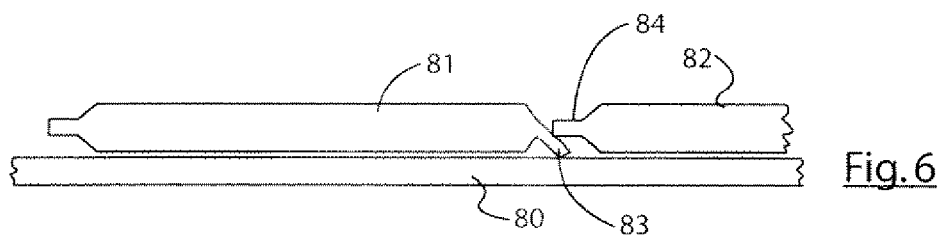
FIG. 6 is an end view of a roofing board in accordance with this invention, along side a fragmentary portion of an adjacent roofing board, as applied to another surface such as a roofing deck, shown fragmentarily, whereby flexible edges of adjacent boards are sufficiently thin to bend into overlapping relation.

Referring now to FIG. 6 in detail, it will be seen that a roof deck 80 is illustrated fragmentally, having a pair of roofing boards 81 and 82 in accordance with this invention applied thereto. Adjacent thin edges 83, 84, overlap each other, and are capable of bending to accommodate the lap, when installed, thereby undergoing a deformation. A seam tape (not shown) may be provided, also covering the lapped joint.

Figure 7:
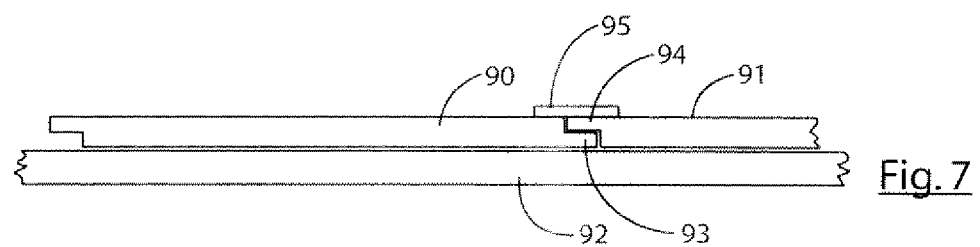
FIG. 7 is an illustration similar to that FIG. 6, but wherein adjacent roofing boards have lapped edges that are in shiplapped relation to each other, and wherein seam tape is also illustrated covering the shiplapped joint.

In FIG. 7, a pair of adjacent roofing boards 90 and 91 are mounted on a roof deck 92, also fragmentally shown, and their adjacent edges 93, 94 are shown in shiplapped relation to each other, with a strip of seam tape 95 also covering the joint.

Figure 8:
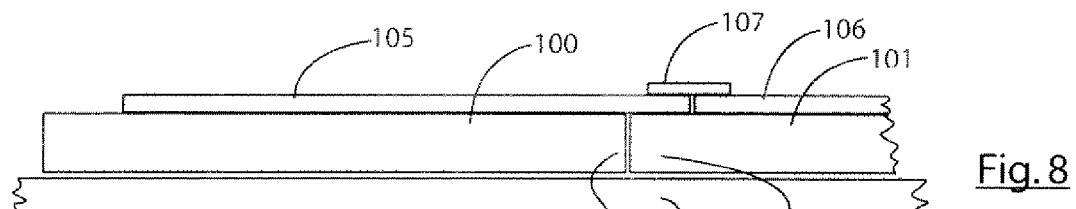
FIG. 8 is another illustration somewhat similar to those of FIGS. 6 and 7, but wherein a covered layer of mat or foil or film of one board overlaps an adjacent board, and wherein seam tape is also provided covering the seam.

In FIG. 8, adjacent roofing boards 100 and 101 cover a roof or other deck 102, with their edges 103, 104 essentially abutting each other, and wherein cover layers 105, 106 of mat, foil or film, carried by the boards 100, 101 provide the overlapping function. Optionally, a strip of seam tape 107 may also be used, covering the edges of the cover layers 105, 106.

Figure 9:
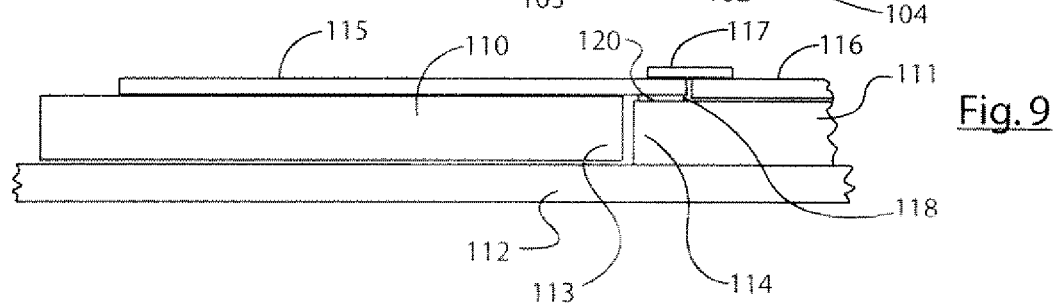
FIG. 9 is another illustration similar to those of FIGS. 6 through 8, but wherein the right edge of the left board has an overlapping cover layer, and wherein adhesive and a release liner is shown beneath the overlapping portion of the cover layer, and wherein seam tape also covers the joint.

In FIG. 9, the adjacent roofing boards 110, 111, are applied to a roofing deck 112, or other structure, also with their adjacent edges 113, 114 abutting each other, and also with cover layers of mat, foil or film 115, 116 applied thereover, again with an optional seaming tape 117 overlapping the lapped edges of the cover layers 115, 116. In the embodiment of FIG. 9, beneath the overlapping right end of the cover layer 115, there is a strip of adhesive 118, with a release liner 120 therebeneath, with the release liner being removable upon installation, to allow the adhesive 118 to adhere the right edge of the cover layer 115 to the uncovered left edge of the board 111.

Figure 10:
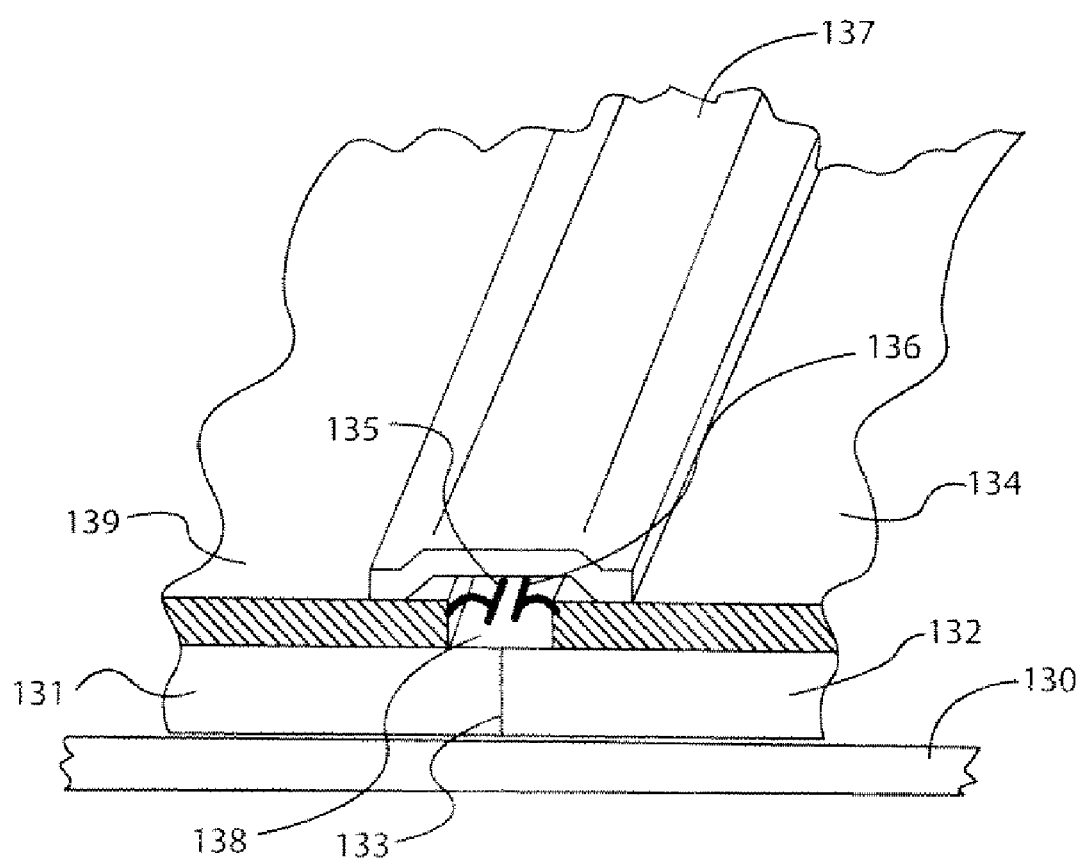
FIG. 10 is a fragmentary perspective illustration of another pair of adjacent roofing boards in accordance with this invention, mounted on a roof or other deck, and wherein the roofing boards each have a photovoltaic layer on their upper surface, with wiring being schematically shown for the photovoltaic layers, and with a protective cover thereover, along the joint.

Referring now to FIG. 10, a roof deck or other structure 130 is shown, with adjacent roofing or other surfacing boards 131, 132 applied thereto, being butt-joined at 133, as shown. It will be understood that the junction 133 could in the alternative be any of those set forth in FIGS. 6 through 9, or otherwise, within the spirit and scope of the invention.

The roofing or other surfacing boards 131, 132 may have respective photovoltaic layers 139, 134, appropriately wired at 135, 136, for electrical connection to a power system, battery, electrical grid, or the like, and preferably with a protective covering 137 for the junction 138 where the photovoltaic layers 139, 134 come together, and also for protecting the electrical wiring 135, 136.

The roofing or other surfacing boards in accordance with this invention may optionally have a surfacing layer applied thereto, to form a radiant barrier, flame retardant or resistant barrier, a barrier for ultraviolet radiation protection, or the like, or for any other form of protection, as is disclosed in U.S. application Ser. No. 12/056,766, filed Mar. 27, 2008, the complete disclosure of which is herein incorporated by reference.

With respect to the photovoltaic feature of this invention, that is discussed more specifically with respect to FIG. 10, photovoltaic elements or layers may be incorporated into the roofing board or other surfacing board in accordance with this invention, in accordance with the disclosure of U.S. application Ser. No. 12/339,943 filed Dec. 19, 2008, the complete disclosure of which is also herein incorporated by reference.

Also, in accordance with this invention, a surface of the roofing or other surfacing board could be a parchment, a metallized plastic film, a metal foil, a waterproofing layer, or other protective layers, as may be desired, or combinations thereof.

It will thus be seen that the present invention discloses a semi-rigid recovery board that includes an asphalt or other bituminous material having particles of recycled shingles or rolled products or other roofing materials embedded therein, with a core thereof being sandwiched between two layers of mat material, such that the board can be applied to a roof structure such as a roof deck or other covering on the roof structure or other structure by means of a factory-supplied self adhesive attachment.

The composite boards of this invention can also provide a waterproofing layer for plastics, parking garages or building floors, especially those that include a cementitious substrate, by providing a surfacing structure therefor, to be adhesively secured to the cementitious substrate disposed therebeneath after removal of the release liner, and can have applied thereover at least one additional cementitious layer, on top of the composite boards. In such a construction, the composite boards can act as a waterproofing layer. The same type of surfacing structure can be used on various floor surfaces, bridges or the like, and therefore provides a composite board for use a building product, for both roof and non-roof structures.

It will also be understood that the adhesive layer 47, while preferably being continuously applied to a surface of a mat layer, could, in the alternative, be discontinuous and could be applied in the shape of dots, strips, or in any other manner. In each case, the adhesive layer can be protected by means of a peelable release liner.

The present invention thus allows an economic advantage, in making use of recycled roofing material, such as recycled shingles, roofing roll products, and the like, and can be applied to a roof without requiring an on-site application of hot asphalt. It creates a clean, solid, even, stable surface for next-overlying layers of shingles, roofing tiles, membranes, or the like.

It will be understood that various modifications can be made in the details of construction as well as in the use and application of the composite boards of this invention, all within the spirit and scope of the invention as defined in the appended claims.

What is claimed is:

1. A composite board for use as a roofing or other surfacing material comprising a sandwich of:
   (a) a core material layer having first, upper, and second, lower, opposite surfaces and being a solidified, previously molten, bituminous material having filler components of recycled roofing products therein that include any of:
      (i) shingle particles containing fibrous material; and
      (ii) roll roofing particles containing fibrous material;
   wherein any fibrous materials of the core material are comminuted particles of fibrous materials
   (b) a first layer of mat material with a lower surface adhered to the first, upper, surface of the core material layer;
   (c) a second layer of mat material with an upper surface thereof adhered to the second, lower, surface of the core material layer;
   (d) a layer of adhesive secured to a lower surface of said second layer of mat material;
   (e) a photovoltaic layer covering an upper surface of said first layer of mat material; and
   (f) a removable layer of release liner adhered to and covering said layer of adhesive of clause (d).

2. The composite board of claim 1, wherein the core material includes an asphalt material.

3. The composite board of claim 1, wherein at least one of said layers of mat material is comprised of any one of:
   (a) fiberglass mat;
   (b) organic felt;
   (c) scrim;
   (d) polyester mat; and
   (e) polypropylene mat.

4. The composite board of claim 1, wherein the layer of adhesive is a continuous layer.

5. The composite board of claim 1, wherein the layer of adhesive is a discontinuous layer.

6. A roof comprised of a plurality of composite boards according to claim 1, with the composite boards being adhesively secured to a roof structure disposed therebeneath after removal of the layer(s) of release liner; with said boards being disposed with edges facing each other at junctions; with wiring in said junctions for electrical connection to a power source; and with protective coverings for said wiring at said junctions.

7. A roof comprised of a plurality of composite boards according to claim 1, with the composite boards being adhesively secured to a roof structure disposed therebeneath after removal of the layer(s) of release liner; with adjacent composite boards having adjacent edges butt-joined together and secured together with joint tape.

8. The roof of claim 6, with adjacent composite boards having adjacent edges butt-joined together and secured together with joint tape.

9. The roof of claim 6, with adjacent composite boards having at least some adjacent edges at least partially overlapped.

10. A surfacing structure for a plaza deck, parking garage, or building floor comprising a cementitious substrate, the surfacing structure being comprised of a plurality of composite boards according to claim 1, with the composite boards being adhesively secured to the cementitious substrate which is disposed therebeneath after removal of the layer(s) of release liner.

11. A composite board for use as a roofing or other surfacing material comprising a sandwich of
   (a) a core material layer having first, upper, and second, lower, opposite surfaces and being a solidified, previously molten bituminous material having filler components of recycled roofing products therein that include any of:
      (i) shingle particles containing fibrous material; and
      (ii) roll roofing particles containing fibrous material;
   and wherein any fibrous materials of the core material are comminuted particles of fibrous materials
   (b) a first layer of mat material with a lower surface adhered to the first, upper, surface of the core material layer;
   (c) a second layer of mat material with an upper surface thereof adhered to the second, lower, surface of the core material layer;
   (d) a layer of adhesive secured to a lower surface of said second layer of mat material;
   (e) a removable layer of release liner adhered to and covering said layer of adhesive of clause (d); and
   (f) wherein a said layer of material from clause (b) comprises a photovoltaic layer.

12. A method of making a composite board for use as a roofing material comprising the steps of:
   (a) providing a first layer of mat material;
   (b) then providing a non-solid molten core material layer on the first layer of mat material with a first surface of the core material layer disposed against the first layer of mat material, with the layer of core material being a bituminous material having filler components of recycled roofing products therein that include any of:
      (i) shingle particles containing fibrous material; and
      (ii) roll roofing particles containing fibrous material;
   and wherein any fibrous materials of the core material are comminuted particles of fibrous materials
   (c) thereafter applying a second layer of mat material onto a second surface of the core material layer;
   (d) applying a layer of adhesive to one of the first and second layers of mat material and securing the layer of adhesive thereto; and
   (e) applying a removable layer of release liner to said layer of adhesive and
   (f) applying a layer of photovoltaic material to the other of said first and second layers.

13. The method of claim 12, including the step of allowing the layer of core material to solidify prior to applying the layer of adhesive pursuant to clause (d).

14. The method of claim 12, wherein the steps of making the composite board are continuous.

15. A method of roofing a roof structure comprising the steps of:
   (a) providing a plurality of composite boards according to claim 1;
   (b) removing the removable layer of release liner from covering the layer of adhesive; and
   (c) applying the composite board with the layer of release liner removed therefrom to a roof structure disposed therebeneath, and adhesively securing the same thereto.

16. The method of claim 15, including the step of abutting adjacent composite boards on the roof structure disposed therebeneath so that they are butt-joined together, and then securing them together with joint tape, prior to applying the roof coverings to the composite boards.

17. The method of claim 15, including the step of overlapping at least some edges of adjacent composite boards.

18. A method of roofing a roof structure comprising the steps of:
   (a) providing a plurality of composite boards according to claim 11;
   (b) removing the removable layer of release liner from covering the layer of adhesive; and
   (c) applying the composite board with the layer of release liner removed therefrom to a roof structure disposed therebeneath, and adhesively securing the same thereto.

19. The method of claim 18, including the step of abutting adjacent composite boards on the roof structure disposed therebeneath so that they are butt-joined together, and then securing them together with joint tape, prior to applying the roof coverings to the composite boards.

20. The method of claim 18, including the step of overlapping at least some edges of adjacent composite boards.

* * * * *